United States Patent
Beier et al.

(10) Patent No.: US 11,565,675 B2
(45) Date of Patent: Jan. 31, 2023

(54) CONTROL VALVE, ELECTRONICALLY CONTROLLABLE BRAKING SYSTEM, AND METHOD FOR CONTROLLING THE ELECTRONICALLY CONTROLLABLE BRAKING SYSTEM

(71) Applicant: WABCO Europe BVBA, Brussels (BE)

(72) Inventors: Peter Beier, Wunstorf (DE); Robert Otremba, Ronnenberg (DE); Julian Van Thiel, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 92 days.

(21) Appl. No.: 17/050,687

(22) PCT Filed: Mar. 29, 2019

(86) PCT No.: PCT/EP2019/058046
§ 371 (c)(1),
(2) Date: Oct. 26, 2020

(87) PCT Pub. No.: WO2019/206565
PCT Pub. Date: Oct. 31, 2019

(65) Prior Publication Data
US 2021/0237702 A1    Aug. 5, 2021

(30) Foreign Application Priority Data

Apr. 26, 2018   (DE) .......................... 102018110088.4

(51) Int. Cl.
*B60T 13/68*   (2006.01)
*B60T 8/17*    (2006.01)
(Continued)

(52) U.S. Cl.
CPC .............. *B60T 13/683* (2013.01); *B60T 8/17* (2013.01); *B60T 8/885* (2013.01); *B60T 13/36* (2013.01);
(Continued)

(58) Field of Classification Search
CPC . B60T 8/17; B60T 8/327; B60T 8/885; B60T 13/36; B60T 13/261; B60T 13/268;
(Continued)

(56) References Cited

U.S. PATENT DOCUMENTS 4,493,510 A * 1/1985 Deike ..................... B60T 15/20
137/627.5
4,575,157 A * 3/1986 Reinecke ................ B60T 15/18
303/40
(Continued)

FOREIGN PATENT DOCUMENTS

AT      332752 B    8/2006
CH      536212 A    4/1973
(Continued)

*Primary Examiner* — Robert A. Siconolfi
*Assistant Examiner* — San M Aung
(74) *Attorney, Agent, or Firm* — Dickinson Wright PLLC

(57) ABSTRACT

A control valve (12) for applying a spring-loaded brake pressure (p3*b*) to spring-loaded parts of a rear-axle wheel brake is provided. The control valve (12) is activatable pneumatically via a second control input (12*b*) with a parking-brake control pressure (p5). The parking-brake control pressure (p5) can act in such a manner on a control mechanism (14*b*, 15*b*, 17*c*, 22, 23, 24) arranged in a valve housing (12*f*) of the control valve (12) that a spring-loaded brake pressure (p3*b*) arises at a control output (12*c*) of the control valve (12) as a function of the parking-brake control pressure (p5) for bringing about a parking-brake braking specification with the spring-loaded parts of the rear-axle wheel brakes. The control valve (12) has a first control connection (12*a*) connectable to an adjustable first control (Continued)

chamber (14a), which is operatively connected to the control mechanism (14b, 15b, 17c, 22, 23, 24).

17 Claims, 3 Drawing Sheets

(51) Int. Cl.
  *B60T 8/88*   (2006.01)
  *B60T 13/36*  (2006.01)
  *B60T 13/38*  (2006.01)
  *B60T 15/22*  (2006.01)
  *B60T 17/22*  (2006.01)

(52) U.S. Cl.
  CPC ............ *B60T 13/385* (2013.01); *B60T 15/22* (2013.01); *B60T 17/221* (2013.01); *B60T 2270/402* (2013.01); *B60T 2270/403* (2013.01); *B60T 2270/413* (2013.01)

(58) Field of Classification Search
  CPC ...... B60T 13/683; B60T 13/385; B60T 15/18; B60T 15/20; B60T 15/22; B60T 2270/402; B60T 2270/403; B60T 2270/413
  USPC ............................................................ 303/2
  See application file for complete search history.

(56) References Cited

U.S. PATENT DOCUMENTS 4,786,116 A * 11/1988 Schulz ................... B60T 15/20
                   303/118.1
5,709,246 A * 1/1998 Koelzer ................ B60T 17/004
                   137/204

FOREIGN PATENT DOCUMENTS

| DE | 3016200 A1 | 11/1981 |
|---|---|---|
| DE | 102016004097 A1 | 10/2017 |
| EP | 013683 A2 | 1/1985 |
| RU | 610699 A1 | 1/2015 |
| WO | 2015169418 A1 | 11/2015 |

* cited by examiner

CONTROL VALVE, ELECTRONICALLY CONTROLLABLE BRAKING SYSTEM, AND METHOD FOR CONTROLLING THE ELECTRONICALLY CONTROLLABLE BRAKING SYSTEM

FIELD

The present disclosure relates to a control valve for applying a spring-loaded brake pressure, and to an electronically controllable brake system with such a control valve, and to a method for controlling the electronically controllable brake system.

BACKGROUND

Conventional electronically controllable brake systems have pressure modulators which are assigned to the individual vehicle axles and are activated electrically during normal operation in order to implement a certain service-brake braking specification at the respective wheels in a service-brake circuit. The electric control takes place from a central module which activates the respective pressure modulators via a control signal corresponding to the service-brake braking specification.

In the event of an electric failure or defect of said electric activation, the pressure modulators are conventionally provided with pneumatic redundancy. For this purpose, a pneumatic control pressure can be transmitted to pneumatic redundancy connections of the respective pressure modulators by a service-brake valve which receives the service-brake braking specification from the driver. In the event of a failure or a defect in the electrically controlled implementation of the braking operation, said pressure modulators ensure air quantity boosting of the control pressure and application of a brake pressure to the respective service brakes. Pneumatic redundancy can thereby be formed.

Furthermore, in addition to the service-brake circuit, such brake systems have a parking-brake circuit in which a parking-brake brake specification from the driver can be received via a parking-brake valve. As a result, a parking-brake control pressure is output by the parking-brake valve to a control valve and, via the latter is output as a spring-loaded brake pressure with air quantity boosting to spring-loaded parts of the wheel brakes, preferably the rear-axle wheel brakes. The spring-loaded parts are, as is known, constructed in such a manner that they are applied by means of spring pretensioning when the spring-loaded brake pressure is low and, when the spring-loaded brake pressure is higher, are opened counter to the spring pretensioning. Therefore, at least at the rear wheels, a braking action can be achieved via a membrane part as a function of the membrane braking pressure output—electrically or pneumatically redundantly by the rear-axle pressure modulator, and via the spring-loaded part as a function of the spring-loaded brake pressure.

A disadvantage in this connection is that, in order to form the pneumatic redundancy at the rear axle, pressure modulators which can be activated pneumatically are required. Said pressure modulators, firstly, are constructed in a technically complicated manner and, secondly, a high outlay has to be expended on laying pressure lines to the rear axle, said pressure lines being required only for the redundancy.

SUMMARY

It is an object of the disclosure to provide a control valve for applying a spring-loaded brake pressure, with which reliable and simple pneumatic control of an electrically controllable brake system can be made possible even in the event of redundancy. It is furthermore the object to provide an electrically controllable brake system and a method for controlling said brake system.

It is accordingly provided, according to the present disclosure, to extend a control valve for applying a spring-loaded brake pressure to spring-loaded parts of a rear-axle wheel brake in such a manner that, in addition to the pneumatic activation via a parking-brake control pressure, which is output by a parking-brake valve, via a first control connection, a pneumatic activation of the control valve with a service-brake control pressure, which is output by the service-brake valve and is dependent on a service-brake braking specification, is also possible.

The advantage is thereby achieved that the spring-loaded parts cannot only be actuated in the customary manner as a function of a parking-brake braking specification, but in addition also as a function of a service-brake braking specification predetermined via a service-brake valve. The control valve according to the disclosure therefore ensures that, in addition to the parking-brake control pressure, the service-brake control pressure is also converted into a corresponding spring-loaded brake pressure, and therefore via the latter a redundant activation of the rear-axle wheel brakes can advantageously take place—in this case via the spring-loaded part. Accordingly, the redundant pneumatic activation of a rear-axle pressure modulator can be dispensed with. The rear-axle pressure modulator can advantageously be constructed more simply as a result because only an electric activation is necessary. For the pneumatic redundancy at the rear axle, recourse can then be made to parts of the parking brake or parking-brake circuit, which parts already have pneumatic components and permits pneumatic activation.

Therefore, only the function of the control valve is to be extended, which occurs according to the present disclosure in that the first control connection—in particular in the event of redundancy—is connectable to an adjustable first control chamber in the control valve, wherein the first control chamber is operatively connected in such a manner to the control mechanism arranged in the control valve that, during an adjustment of the first control chamber as a result of pressurization with the service-brake control pressure, the spring-loaded brake pressure at the control output can be set as a function of the service-brake control pressure and/or the parking-brake control pressure.

The service-brake control pressure is predetermined here either by a front-axle service-brake control pressure or by a redundancy service-brake control pressure. In the first variant, the service-brake valve is formed with a single channel, i.e. depending on the service-brake braking specification, a front-axle service-brake control pressure is generated and transmitted to a redundancy connection of a front-axle pressure modulator. The latter serves for the redundant pneumatic activation of the front-axle pressure modulator should the electrical activation thereof fail. The front-axle service-brake control pressure is also supplied via a branch line to the first control connection of the control valve, and therefore an intervention can be made, likewise redundantly, at the rear axle. As a result, the service-brake valve can advantageously be formed more simply and cost-effectively since just one channel is necessary.

Alternatively, it is provided, in the second variant, that the service-brake valve is formed with two channels, wherein a first channel is connected to the redundancy connection of the front-axle pressure modulator, for the pneumatic activation of the front-axle pressure modulator with the front-axle service-brake control pressure (as described above) and a second channel is connected to the first control connection of the control valve, in order to transmit a redundancy control pressure, which is generated in the service-brake valve depending on the service-brake braking specification in the second channel, to the control valve. In this case, the branch line can be omitted. As a result, a separate two-channel design can advantageously be achieved, and therefore the front axle and the rear axle can be pneumatically and redundantly braked independently of one another if the need arises.

The control mechanism in the control valve therefore ensure that a certain spring-loaded brake pressure arises at the control output of the control valve as a function of the parking-brake control pressure, which corresponds to conventional air quantity boosting in the parking-brake circuit. Owing to the fact that the first control chamber likewise interacts with said control mechanism, the respective service-brake control pressure admitted into the first control chamber can also have an influence on the spring-loaded brake pressure and therefore, as a function thereof, a pneumatically redundant activation of the rear-axle wheel brakes can also take place.

The control mechanism of the control valve are preferably formed by an adjustable second control chamber and an adjustable second control piston, wherein the parking-brake control pressure can be admitted into the second control chamber via the second control input and the second control piston is adjustable in a first direction or a second direction opposed to the first direction by action of the parking-brake control pressure on the second control piston. A simple piston adjustment which can be used for air quantity boosting of the parking-brake control pressure for setting the spring-loaded brake pressure can therefore be achieved.

This preferably takes place by the fact that the second control chamber is bounded by a third wall arranged on the adjustable second control piston, wherein the third wall is movable in relation to the valve housing in such a manner that the second control piston can be adjusted by action of the parking-brake control pressure on the third wall. A simple construction of the control mechanism for setting the spring-loaded brake pressure is thereby achieved.

The first control chamber is preferably operatively connected to a first control piston and the first control piston interacts with the second control piston in such a manner that the second control piston is carried along by an adjustment of the first control piston. The first control piston is preferably fixedly connected to the second control piston for this purpose.

An operative connection between the control mechanism of the control valve, which control mechanism ensures implementation of the parking braking operation, and the adjustable first control chamber, which is influenced by the respective service-brake control pressure, is hereby advantageously provided simply. In the event of redundancy, the service-brake control pressure can therefore ensure adaptation of the spring-loaded brake pressure by recourse being made to the control mechanism of the control valve, and therefore a simple construction of the control valve with said additional functionality (pneumatic redundancy) is achieved.

Furthermore, it is preferably provided that the first control chamber is bounded by a first wall which is movable in relation to a valve housing and by a second wall which is fixed to the valve housing, wherein the first control piston is connected to the first wall in such a manner that the first control piston and the second control piston, which is operatively connected thereto, are forced by an increase in pressure in the first control chamber in a first direction. As a result, an adjustment of the first control chamber as a function of the service-brake control pressure and therefore also of the two control pistons can be achieved in a simple manner.

Preferably, the second control chamber is thereby arranged relative to the first control chamber in such a manner that the second control piston and the first control piston which is operatively connected thereto are forced, when there is an increase in pressure in the second control chamber, in the second direction. The effect which can advantageously be achieved by this is that, with the same control valve, a service-brake control pressure which is inverted in relation to the parking-brake control pressure can nevertheless be converted by the control mechanism of the control valve into a spring-loaded brake pressure which is proportional thereto. This is achieved in a simple manner specifically by an increase in pressure in the respective control chamber leading to a piston movement in the opposite direction.

This can preferably be achieved by the second control chamber—similar to the first control chamber—likewise being bounded by the second wall which is fixed to the valve housing, wherein, when there is an increase in pressure in the second control chamber, the second control piston is pushed away from the second wall in the second direction, and, when there is an increase in pressure in the first control chamber, the first control piston is pushed away from the second wall in the first direction. This opposed movability in the event of an increase in pressure can thereby be obtained in a simple manner.

According to a preferred aspect, the first control chamber and the second control chamber interact with each other via the control pistons in such a manner that a spring-loaded brake pressure arises at the control output, said spring-loaded brake pressure being dependent on the parking-brake control pressure prevailing in the second control chamber or on the service-brake control pressure prevailing in the first control chamber, depending on which of the two control pressures is the higher. Accordingly, self-regulation advantageously takes place by way of the control valve, i.e. a currently acting braking operation of the vehicle via the spring-loaded parts of the rear-axle wheel brakes, i.e. in the parked state with a corresponding parking-brake braking specification, cannot be overridden by a redundantly predetermined service-brake braking specification which specifies a smaller braking action. If, however, a metered parking-brake braking specification is present along with a redundant service-brake braking specification in the event of an electric defect or failure, the service-brake braking specification is implemented if this leads to a greater braking action than the metered parking-brake braking specification.

According to a preferred aspect, for this purpose an area ratio between the movable first wall of the first control chamber and the movable third wall of the second control chamber is between 1:2 and 2:1 (or else optionally less or more). It is thereby advantageously possible to adjust how strong the action of the service-brake control pressure may be in relation to the parking-brake control pressure in the control valve. If, accordingly, there is a small area ratio, i.e. the third wall is very much larger than the first wall, the influence of the service-brake control pressure on the spring-loaded brake pressure is lower. The resulting effect is that the spring-loaded brake pressure is not converted 1:1, i.e. a certain increase in pressure in the first control space does not ensure the same increase in pressure of the spring-loaded brake pressure. In the definition of the area ratio, the maximum force which can act on the spring-loaded part or membrane part of the combined cylinder of the rear-axle wheel brakes should furthermore be taken into consideration.

According to a preferred aspect, it is provided that an axially movable valve body which is pretensioned by a compression spring is furthermore provided as the control mechanism, wherein, depending on the axial adjustment of the valve body, the control output is connectable either via a pressure chamber to a venting connection for reducing the spring-loaded brake pressure or to a supply connection for increasing the spring-loaded brake pressure, wherein the second control piston can adjust the valve body axially as a function of the parking-brake control pressure and/or the service-brake control pressure. As a result, a setting of the spring-loaded brake pressure as a function of the respective control pressure is made possible in a simple manner.

For the redundant control of the spring-loaded brake pressure as a function of the respective service-brake control pressure, it is advantageously provided that the control valve has a control device, wherein the control device can switch over a third control piston in the control valve in such a manner that the first control connection is connected to the adjustable first control chamber via a connecting channel. As a result, the respective service-brake control pressure conducted into the first control chamber can indirectly act on the control mechanism. In a further switching position, the third control piston can be adjusted by the control device in such a way that the atmosphere is connected to the first control chamber for venting the first control chamber. This is the case whenever the service-brake control pressure is not intended to have any influence on the spring-loaded brake pressure, i.e. in particular whenever the brake system functions normally and therefore no redundant pneumatic activation of the rear-axle wheel brakes is required.

According to the present disclosure, an electronically controllable brake system is therefore provided with front-axle wheel brakes, rear-axle wheel brakes with a spring-loaded part and a membrane part, an electro-pneumatically controllable front-axle pressure modulator for outputting a front-axle brake pressure to the front-axle wheel brakes, an electronically controllable rear-axle pressure modulator for outputting a membrane-brake pressure to the membrane parts of the rear-axle wheel brakes, a central module, and an electro-pneumatic single- or multi-channel service-brake valve. The service-brake valve is designed in this case to output an electric service-brake actuating signal to the central module as a function of a service-brake braking specification, wherein the central module is connected in a signal-conducting manner to the front-axle pressure modulator and to the rear-axle pressure modulator for transmitting control signals, which are dependent on the service-brake actuating signal, to the pressure modulators during normal operation. The service-brake valve is furthermore designed to output a pneumatic service-brake control pressure as a function of the service-brake braking specification, wherein, in the event of redundancy, the front-axle pressure modulator is activatable via a redundancy connection with the front-axle service-brake control pressure.

Furthermore, the brake system has a parking-brake valve, wherein the parking-brake valve can output a parking-brake control pressure to the second control input of the control valve according to the present disclosure as a function of a parking-brake braking specification, wherein the control valve produces a spring-loaded brake pressure as a function of the parking-brake control pressure and outputs same via a control output to the spring-loaded parts of the rear-axle wheel brakes. The service-brake valve is, according to the present disclosure, furthermore connected to a first control input of the control valve in order to also transmit the respective service-brake control pressure to the control valve and thus to make it possible to set the spring-loaded brake pressure as a function of the parking-brake control pressure and/or of the service-brake control pressure.

It is preferably provided, according to an aspect of the present disclosure, that the central module is connected in a signal-conducting manner to the control valve, for transmitting the switching-over signal for optionally connecting the first control connection of the control valve to the first control chamber or the atmosphere to the first control chamber, wherein, during normal operation without there being a defect or a failure in the electric activation of the rear-axle pressure modulator, it can be predetermined via the switching-over signal that the atmosphere is connected to the first control chamber and, otherwise, the first control connection of the control valve is connected to the first control chamber. As a result, it is advantageously possible to set the situation in which the service-brake control pressure is conducted into the first control space only if there is actually an electric defect in the activation of the membrane parts of the rear-axle wheel brakes and thus a redundant activation of the rear-axle wheel brakes is required.

According to the present disclosure, it is thus provided in a method that the first control input of the control valve, when an electric defect or a failure in the electric activation of the rear-axle wheel brakes is detected by the membrane part, is connected to the first control chamber, and therefore a spring-loaded brake pressure which is dependent on the respective service-brake control pressure can be applied to the spring-loaded parts of the rear-axle wheel brakes. During normal operation, by contrast, it is possible, without detection of an electric defect or a failure in the electric activation of the rear-axle wheel brakes by the membrane part, for the central module to predetermine, via the switching-over signal to the control valve, that the first control chamber is connected to the atmosphere, and therefore the first control chamber does not have any influence on the setting of the spring-loaded brake pressure.

BRIEF DESCRIPTION OF THE DRAWINGS

The disclosure will be explained in more detail below with reference to a plurality of figures, in which.

DETAILED DESCRIPTION OF THE DRAWINGS

Figure 1:
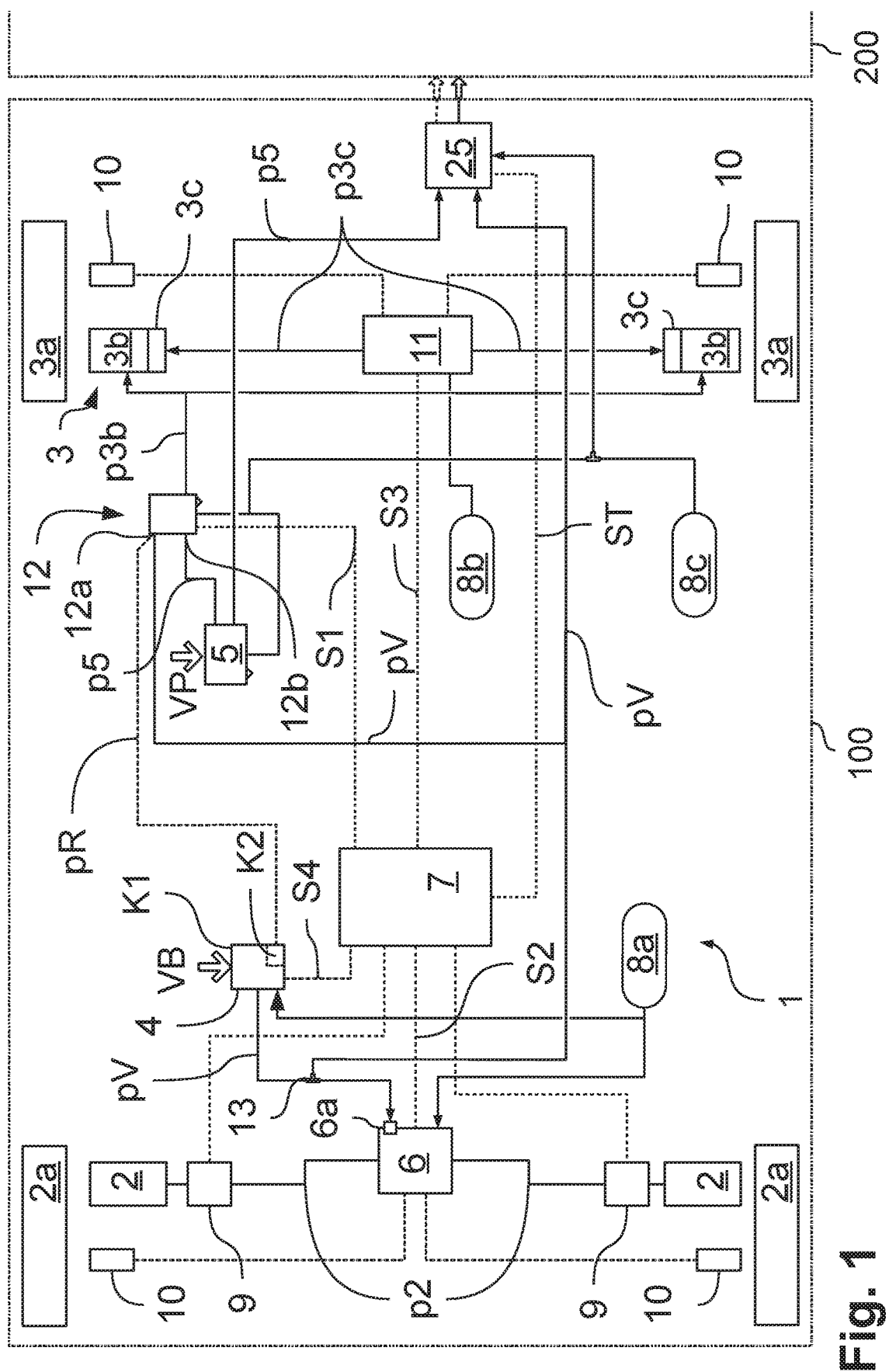
FIG. 1 is a schematic view of an electronically controllable brake system with a pneumatically controllable parking brake.

FIG. 1 illustrates a vehicle combination consisting of a towing vehicle 100 and a trailer 200 attached thereto. The towing vehicle 100 has an at least a partially electrically controllable, two-circuit brake system 1, the front-axle and rear-axle wheel brakes 2, 3 of which can be actuated by manual actuation of a service-brake valve 4 and of a parking-brake valve 5.

When the service-brake valve 4 is actuated with a certain service-brake braking specification VB, a front-axle brake pressure p2 corresponding to the specification can be built up in an electrically or pneumatically controlled manner at the front-axle wheel brakes 2. For this purpose, a front-axle service-brake control pressure pV is transmitted to a front-axle pressure-regulating module 6 via a pneumatic redundancy connection 6a by the pneumatic part of the service-brake valve 4 as a function of the level of the service-brake braking specification VB.

Furthermore, a front-axle control signal S2 is transmitted electronically to the front-axle pressure-regulating module 6 from a central module 7. The front-axle control signal S2 is formed from a service-brake actuating signal S4 which is output by the electronic part of the service-brake valve 4 to the central module 7 as a function of the service-brake braking specification VB and is processed further in the central module. The central module 7 can carry out, for example, an axle load distribution or further master functions and can generate the front-axle control signal S2 as a function thereof. As a function of the front-axle control signal S2, a front-axle brake pressure p2 for the front-axle wheel brakes 2 is produced in the front-axle pressure modulator 6, the front-axle brake pressure leading to braking of the towing vehicle 100 in accordance with the service-brake braking specification VB and optionally the master functions. This takes place in a known manner by a corresponding electronic activation of an inlet valve/output valve combination (not illustrated) which is integrated in the front-axle pressure modulator 6 and with which pressure medium is conducted out of a first pressure-medium reservoir 8a in an appropriately pressure-reduced manner to the front-axle wheel brakes 2.

The front-axle brake pressure p2 can be modified via additional ABS control valves 9 which are arranged upstream of the front-axle wheel brakes 2. This makes it possible to oppose a locking, detected via wheel speed sensors 10, or imminent locking of the front wheels 2a. According to this embodiment, the ABS control valves 9 are activated by the central module 7 in which a corresponding intelligent ABS control logic is integrated.

During normal operation, the front-axle wheel brakes 2 are actuated in a manner controlled electrically via the central module 7. If the electronic activation of the front-axle pressure modulators 6 fails for any reason, for example because the signal transmission between the central module 7 and the front-axle pressure modulator 6 is interrupted and/or the central module 7 and/or the front-axle pressure modulator 6 has a failure on the electrical level, the front-axle wheel brakes 2 can also be controlled pneumatically via the pneumatic redundancy connection 6a as a function of the pneumatic front-axle service-brake control pressure pV. For this purpose, the front-axle service-brake control pressure pV, which is output by the service-brake valve 4, is appropriately air-quantity-boosted in the front-axle pressure modulator 6 and output as front-axle brake pressure p2 to the front-axle wheel brakes 2. As a result, a pneumatically controlled fallback level for the front-axle wheel brakes 2 is created, and therefore, even in the event of electric failures, the towing vehicle 100 can still be reliably braked via the front wheels 2a.

The real-axle wheel brakes 3 for braking the rear wheels 3a are designed as combined spring-loaded membrane cylinders, i.e. they have a spring-loaded part 3b and a membrane part 3c. For a conventional service-brake function, a membrane brake pressure p3c can be predetermined by a rear-axle pressure modulator 11 in an appropriately pressure-reduced manner from a second pressure medium reservoir 8b in order to actuate the membrane part 3c of the rear-axle wheel brakes 3. The rear-axle pressure modulator 11 differs here from the front-axle pressure modulator 6 by the fact that a redundancy connection for a pneumatic activation is not provided. Accordingly, the rear-axle pressure modulator 11 can merely be activated electrically, similar to the electrical activation of the front-axle pressure modulator 6.

To this extent, the rear-axle pressure modulator 11 is constructed comparably to the electrical level of the front-axle pressure modulator 6, and therefore a corresponding membrane brake pressure p3c can be produced and output via an inlet/outlet valve combination by the rear-axle pressure modulator 11 via a rear-axle control signal S3 output by the central module 7 as a function of the service-brake braking specification VB. A locking-protected adaptation of the membrane brake pressure p3c as a function of the measurement of the speed sensors 10 at the rear wheels 3a already takes place at the rear axle in the rear-axle pressure modulator 11 without additional ABS control valves. In this respect, the membrane brake pressure p3c is already adapted by the ABS function.

Because, in contrast to the front-axle pressure modulator 6, the rear-axle pressure modulator 11 does not have any pneumatic redundancy, it is provided according to the disclosure to form a pneumatic redundancy via the spring-loaded part 3b of the rear-axle wheel brakes 3. The spring-loaded part 3b functions in such a manner that, in the event of a reduction in a spring-loaded brake pressure p3b acting on the spring-loaded part 3b, the wheel brakes 3 are automatically applied or the braking action at the rear wheels 3a is increased. If the spring-loaded brake pressure p3b is increased, the spring-loaded part 3b is opened further counter to spring pretensioning and a braking action at the rear wheels 3a is thereby reduced or entirely eliminated.

The spring-loaded parts 3b of the rear-axle wheel brakes 3 are conventionally used for a parking-brake function in the vehicle 100, said parking-brake function being controlled via the parking-brake valve 5 in a parking brake circuit. If, accordingly, a certain parking-brake braking request VP is specified by the driver via the pneumatic parking-brake valve 5, a corresponding parking-brake control pressure p5 is output by the parking-brake valve 5 and transmitted to a first control input 12a of a control valve 12. The control valve 12 ensures air quantity boosting of the parking-brake control pressure p5, and therefore a spring-loaded brake pressure p3b is output via a control output 12c to the spring-loaded part 3b of the rear-axle wheel brake 3, said spring-loaded part leading to braking of the vehicle 100 in accordance with the parking-brake braking request VP.

If the driver specifies via the parking-brake braking request VP that the vehicle is intended to be parked, i.e. the full braking action is intended to be achieved via the spring-loaded parts 3b, the line between the parking-brake valve 5 and the control valve 12 is vented, and therefore a parking-brake control pressure p5 corresponding to the atmospheric pressure prevails at the first control input 12a of the control valve 12. The spring pretensioning therefore ensures application of the spring-loaded parts 3b. If the parking-brake valve 5 is in a travel position or any desired intermediate position, a correspondingly high parking-brake control pressure p5 is specified at the first control input 12a from the third pressure medium reservoir 8c, and therefore the spring-loaded parts 3b are continuously opened by the spring-loaded brake pressure p3b counter to the spring pretensioning.

According to the disclosure, the control valve 12 is extended in such a manner that, in addition to the described parking-brake function, a redundant pneumatic activation of the rear-axle wheel brakes 3 can also take place—in this case via the spring-loaded part 3b. This takes place in particular whenever the rear-axle pressure modulator 11 and/or the central module 7 and/or the electric connection in between has an electric defect or failure, that is to say a braking operation of the rear wheels 3a can no longer take place in a manner controlled electrically by the central module 7.

For this purpose, the front-axle service-brake control pressure pV output by the pneumatic part of the service-brake valve 4 in the event of a manual braking operation is guided via a branch line 13 to a second control input 12b of the control valve 12, wherein the control valve 12 produces a spring-loaded brake pressure p3b which is inverse to the front-axle service-brake control pressure pV and is air-quantity boosted, and outputs same via the control output 12c to the spring-loaded part 3b of the wheel brakes 3. The air-quantity boosting of the parking-brake control pressure p5 and of the front-axle service-brake control pressure pV takes place in the control valve 12 by pressure being supplied by the third pressure medium reservoir 8c.

Alternatively, it can also be provided to supply a redundancy service-brake control pressure pR corresponding to the service-brake braking specification VB to the control valve 12 instead of the front-axle service-brake control pressure pV, said redundancy service-brake control pressure pR being produced and output in the service-brake valve 4 in a manner comparable to the front-axle service-brake control pressure pV. The service-brake valve 4 is then constructed with two channels, wherein the front-axle service-brake control pressure pV for pneumatically activating the front-axle pressure modulator 6 is produced and output via a first channel K1 and the redundancy service-brake control pressure pB for pneumatically activating the control valve 12 is produced and output via a second channel K2. FIG. 1 schematically illustrates this optional embodiment by means of a further dashed channel K2 at the service-brake valve 4 and a pneumatic control line from the service-brake valve 4 to the first control input 12a of the control valve 12. In said dashed embodiment, the branch line 13 is then dispensed with. The activation via the front-axle service-brake control pressure pV, which activation can be transmitted in a corresponding manner to the service-brake control pressure pB, will be described below.

In certain situations, the control valve 12 according to the disclosure therefore additionally takes on the task of inverting and air-quantity boosting of the front-axle service-brake control pressure pV, and therefore this enables a redundant pneumatic activation of the rear-axle wheel brakes 3 to take place. In order to give the parking-brake braking specification VP higher priority, the control valve 12 according to this embodiment is designed in such a manner that the implementation of the parking-brake braking specification VP or the air quantity boosting of the parking-brake control pressure p5 has precedence over the inverting and air-quantity boosting of the front-axle service-brake control pressure pV.

Furthermore, it is specified in this embodiment that a pneumatic activation of the control valve 12 with the front-axle service-brake control pressure pV only leads to a corresponding spring-loaded brake pressure p3b being output to the spring-loaded part 3b when an electric activation via the rear-axle pressure modulator 11 and a corresponding output of the membrane brake pressure p3c fails. Otherwise, the front-axle service-brake control pressure pV continues to be transmitted to the control valve 12 via the second control input 12b without any effect on the spring-loaded part 3b of the rear-axle wheel brakes 3.

Figure 2:
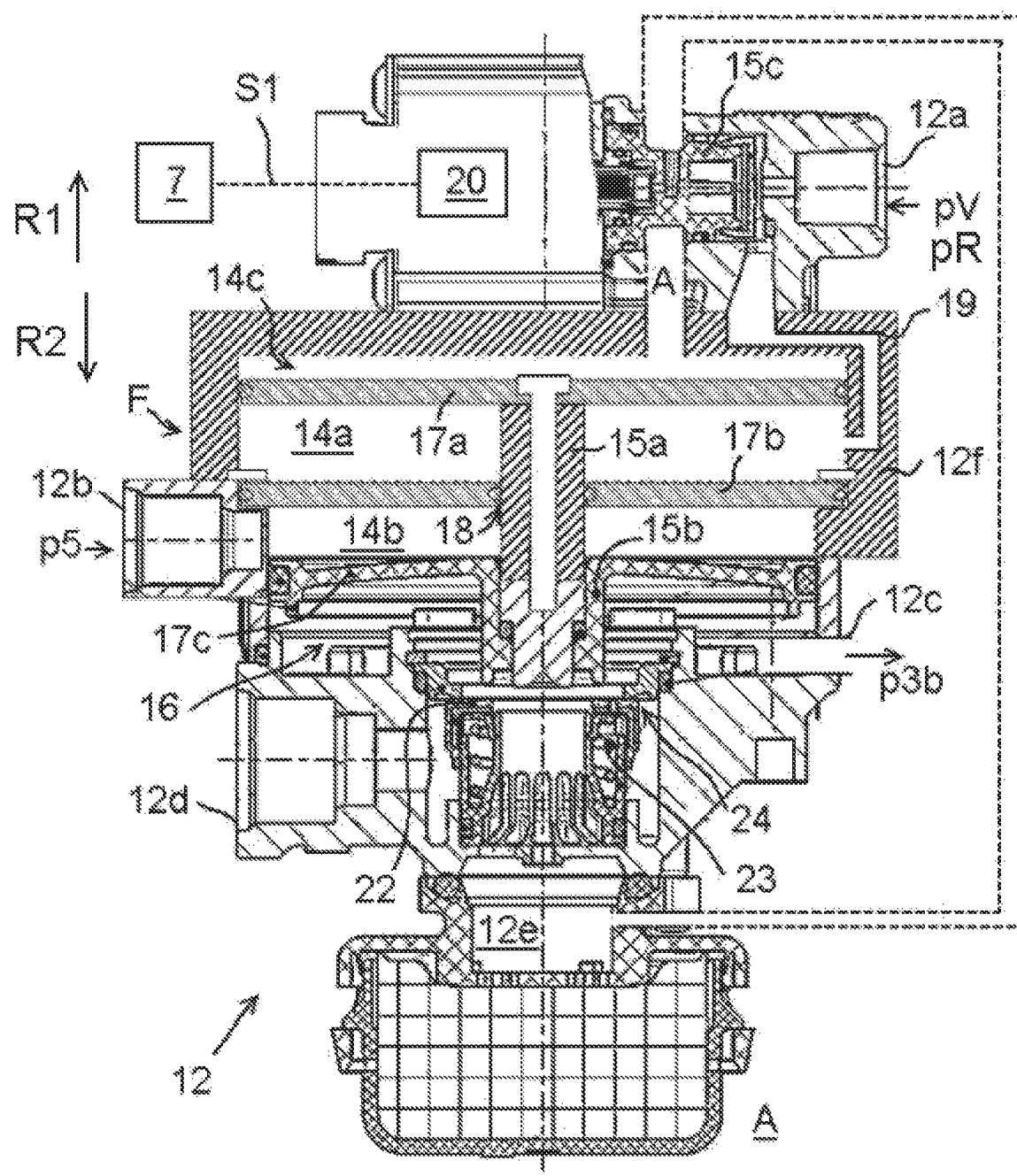
FIG. 2 is a detailed cross-sectional view of a control valve of the electronically controllable brake system according to FIG. 1, according to an aspect of the disclosure.

In order to achieve all this, the control valve 12 illustrated in FIG. 2 is provided. The control valve 12 consists of the control inputs 12a, 12b, via which the front-axle service-brake control pressure pV or the parking-brake control pressure p5 are predetermined, and the control output 12c which outputs the spring-loaded brake pressure 3b to the spring-loaded part 3b. Furthermore, a supply connection 12d is provided which is connected to the third pressure-medium reservoir 8c and ensures that the pressure medium is supplied to the control valve 12. The control valve 12 can be connected to the atmosphere A via a venting connection 12e.

The control valve 12 furthermore, has three control chambers 14a, 14b, 14c and three control pistons 15a, 15b, 15c as functional elements, wherein two of the control pistons 15a, 15b are fixedly connected to each other and thus carry each other along. By means of an axial movement of the two control pistons 15a, 15b, a pressure chamber 16 of the control valve 12 can be connected to the supply connection 12d or to the venting connection 12e. The pressure chamber 16 is furthermore connected to the control output 12c, and therefore, depending on the axial position of the two control pistons 15a, 15b, a pressure increase (via 12d) or a pressure reduction (via 12e) of the spring-loaded brake pressure p3b prevailing at the control output 12c can take place. This takes place according to the following principle:

A first control piston 15a is connected to a first wall 17a and is mounted in an axially displaceable manner in an opening 18 in a second stationary wall 17b of the control valve 12. The opening 18 like the first wall 17a is sealed, and therefore a first control chamber 14a is formed between the first wall 17a and the second wall 17b and a valve housing 12f of the control valve 12, said control chamber being able to be enlarged and reduced by axial displacement of the first control piston 15a and of the first wall 17a connected thereto. The first control chamber 14a is connected via a connecting channel 19 to the first control input 12a of the control valve 12 in order to be able to conduct the pressure medium having the front-axle service-brake control pressure pV into the first control chamber 14a. The connection between the first control chamber 14a and the first control input 12a can be blocked via a third control piston 15c.

For this purpose, the third control piston 15c can be switched over in an electrically controlled manner by a control device 20 in order to open up or to block the front-axle service-brake control pressure pV. For this purpose, the control device 20 is connected in a signal-conducting manner to the central module 7. During normal operation without the presence of an electric fault, the central module 7 provides the command for switching over the third control piston 15c via a switching-over signal S1 in such a manner that the front-axle service-brake control pressure pV at the first control input 12a is blocked by the third control piston 15c. Instead, the connecting channel 19 is connected by the position of the third control piston 15c to the venting connection 12e via a venting channel 21 arranged in any desired manner at the control valve 12. As a result, the first control chamber 14a is under atmospheric pressure, and therefore the effect achieved during normal operation is that the front-axle service-brake control pressure pV does not influence the function of the control valve 12. If the central module 7 fails or if another electric fault is present in the rear-axle pressure modulator 11 or when the rear-axle pressure modulator 11 is activated, no switching-over signal S1 is transmitted to the control valve 12. The control device 20 then automatically switches over the third control piston 15c in such a manner that the front-axle service-brake control pressure pV is admitted into the first control chamber 14a.

Furthermore, a third control chamber 14c is defined above the first wall 17a and below the valve housing 12f, which third control chamber 14c is permanently connected in any desired manner to the venting connection 12e and is therefore under atmospheric pressure. When there is a change in pressure in the first control chamber 14a, this allows an axial displacement of the first wall 17a.

A third wall 17c of the second control piston 15b together with the stationary second wall 17b defines a second control chamber 14b. In this exemplary embodiment, the first control piston 15a protrudes into the latter in order to achieve a fixed connection to the second control piston 15b in the lower region. The second control chamber 14b is connected to the second control input 12b, and therefore the parking-brake control pressure p5 prevailing at the second control input 12b also acts in the second control chamber 14b. Depending on the level of the parking-brake control pressure p5, the second control piston 15b is displaced axially upward in a first direction R1 or downward in a second direction R2 via the third wall 17c together with the first control piston 15a.

When the parking-brake valve 5 is actuated, the second control input 12b is first of all vented, and therefore a parking-brake control pressure p5 corresponding to the atmospheric pressure is present in the second control chamber 14b. This results in the state which is illustrated in FIG. 2 and in which the second control piston 15b is adjusted axially upward because of the small action of pressure on the third wall 17c. The pressure chamber 16 is thereby connected to the venting connection 12e, and the control output 12c is likewise vented, i.e. there is a small spring-loaded brake pressure p3b, and therefore the spring-loaded parts 3b of the rear-axle wheel brakes 3 are applied by the spring pretensioning.

When parking-brake control pressure p5 increases in the second control chamber 14b because of a withdrawal of the actuation of the parking-brake valve 5, the second control piston 15b is pressed axially downward via the third wall 17c until it comes with its lower region against a valve body 22 in a sealing manner from a certain axial adjustment, and therefore, in comparison to the state in FIG. 2, the connection between the control output 12c and the venting connection 12e is separated via the pressure chamber 16. The pressure chamber 16 is then only still connected to the control output 12c. The spring-loaded brake pressure p3b is thereby maintained.

During a further increase in pressure of the parking-brake control pressure p5, the second control piston 15b presses the valve body 22 downward counter to the force of a compression spring 23, as a result of which a passage 24 opens, and therefore a connection between the supply connection 12d and the control output 12c is produced via the pressure chamber 16. As a result thereof, the spring-loaded brake pressure p3b is increased and the spring-loaded part 3b is opened counter to the spring force, and therefore the rear-axle wheel brakes 3 deploy only a little braking action, if any at all.

Owing to the fixed connection between the two control pistons 15a, 15b, the control function just described, i.e. the connection of the venting connection 12e to the control output 12c for applying the spring-loaded part 3b or the connection of the supply connection 12d to the control output 12c for opening the spring-loaded part 3b can likewise also take place by way of the change in the pressure in the first control chamber 14a. This can take place during an absence of the switching-over signal S1 as already indicated above:

Unlike the second control chamber 14b, an increase in pressure in the first control chamber 14a brings about an axial upward adjustment of the two control pistons 15a, 15b. As a result, the front-axle service-brake control pressure pV is inverted since, in the event of a high front-axle service-brake control pressure pV, the second control piston 15b is lifted off from the valve body 22 and the control output 12c is therefore connected to the venting connection 12e and the spring-loaded parts 3b can therefore be applied via a low spring-loaded brake pressure p3b. By contrast, as the front-axle service-brake control pressure pV becomes lower, the volume in the first control chamber 14a becomes smaller and a connection of the control output 12c to the supply connection 12d as a result of an axial adjustment of the control pistons 15a, 15b downward lead to an increasing spring-loaded brake pressure p3b and therefore to release of the spring-loaded parts 3b of the rear-axle wheel brakes 3.

The effect which can be achieved by the above-described functionality of the control valve 12 is that, despite a redundant service-brake braking specification VB (no switching-over signal S1), a correspondingly present parking-brake braking specification VP actually leads to braking or stopping of the vehicle 100 in the, for example, parked state. This is achieved by the oppositely acting control pistons 15a, 15b and the compression spring 23 which is in effect. If, for example, in the event of a full parking-brake braking specification VP, a low parking-brake control pressure p5 is present in the second control chamber 14b, the control output 12c would be connected to the supply connection 12c in order to release the spring-loaded parts 3b. That is to say, the first control piston 15a would have to ensure an axial movement of the second control piston 15b downward in FIG. 2. This can take place, if at all, only if a very low front-axle service-brake control pressure pV is present in the first control chamber 14a because otherwise axial raising of the control pistons 15a, 15b takes place. If the starting point is from a low front-axle service-brake control pressure pV—corresponding to a small redundant service-brake braking specification VB—which cannot drop below the atmospheric pressure currently present in the second control chamber 14b, said control pressure is not capable of ensuring a sufficiently high compressive force for compressing the compression spring 23. The compression spring 23 should be accordingly configured. Release of the spring-loaded parts 3b is thereby prevented.

If, conversely, no parking-brake braking specification VP is present, the control pistons 15a, 15b are adjusted axially downward during normal operation, and therefore a maximum spring-loaded brake pressure p3b is in action. The front-axle service-brake control pressure pV prevailing in the first control chamber 14a during a redundant service-brake braking specification VB (no switching-over signal S1) then, counter to said axial movement, pushes the control pistons 15a, 15b upward again to a certain extent such that the spring-loaded brake pressure p3b is dissipated again and a partial application of the spring-loaded parts 3b is achieved. The forces acting on the two control pistons 15a, 15b by way of the prevailing control pressures p5, pV are therefore combined, and therefore a corresponding braking action is achieved by the spring-loaded parts 3b.

By adapting an area ratio of the first and third walls 17a, 17c to each other, the influence of the front-axle service-brake control pressure pV on the spring-loaded parts 3b can be set in the pneumatic redundancy situation. Accordingly, for example, at an area ratio F of 1:2 between the first wall 17a and the third wall 17c, it is possible to set the situation in which only a portion of, e.g., 50% (at an identical maximum force of the membrane part and spring-loaded part 3b, 3c of the combined cylinder in the rear-axle wheel brakes 3) of the braking action required pneumatically via the front-axle service-brake control pressure pV is redundantly converted by the spring-loaded parts 3b at the rear axle. That is to say, the parking-brake control pressure p5 in the second control space 14b brings about a higher axial force on the control pistons 15a, 15b than a comparable front-axle service-brake control pressure pV in the first control space 14a. The portion of the braking action which is actually intended to be exerted on the rear wheels 3a in the redundancy situation is thereby determined.

For the selection of the area ratio F, the force ratio of the membrane part to the spring-loaded part 3a, 3b of the combined cylinder in the rear-axle wheel brakes 3 should, optionally, also be taken into consideration. If, accordingly, the maximum force of the spring-loaded part 3b is, for example, half the size of the maximum force of the membrane part 3c, an area ratio F of approx. 1:1 should be provided for the conversion of a portion of 50% of the braking action required pneumatically via the front-axle service-brake control pressure pV by the spring-loaded parts 3b according to the above example.

In particular, the area ratios F can be set in such a manner that, in the event of a non-full parking-brake braking specification VP and a full redundant service-brake braking specification VB (no switching-over signal S1), the spring-loaded parts 3b are fully applied in order, in the redundancy situation, to be able to retrieve the maximum braking action at the rear axle. If both the parking-brake braking specification VP and the redundant service-brake braking specification VB (no switching-over signal S1) are not at maximum, it is possible via the area ratios F to set the situation in which always the maximum of the two braking actions is converted by the spring-loaded parts 3b.

An electric and/or pneumatic transmission of the front-axle service-brake control pressure pV and of the parking-brake control pressure p5 or of an electric trailer control signal ST can take place in a conventional manner via a trailer control valve 25 in order also to be able to brake the trailer 200.

Figure 3:
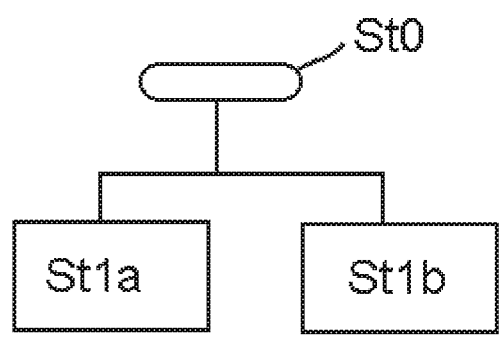
FIG. 3 is a flow diagram of the method according to an aspect of the disclosure.

The effect can therefore be achieved according to the disclosure according to FIG. 3 that, in a method, it is first of all checked whether the central module 7 has a defect and/or the connection to the rear-axle pressure modulator 11 has a defect and therefore electric activation of the rear-axle wheel brakes 3 is not possible (St0). If this is not the case, in a first alternative step St1a, it is specified to the control valve 12 via the switching-over signal S1 that the third control piston 15c prevents introduction of the front-axle service-brake control pressure pV or of the redundancy service-brake control pressure pR into the first control chamber 14a. The first control chamber 14a is therefore connected to the atmosphere A and does not influence the implementation of the parking-brake braking specification VP. If, however, there is a defect in the electric activation of the rear-axle pressure modulator 11, there is no switching-over signal S1 and, in a second alternative step St1b, it is specified to the control valve 12 that the front-axle service-brake control pressure pV or the redundancy service-brake control pressure pR should be admitted into the first control chamber 14a. If there is no parking-brake braking specification VP, when there is a service-brake braking specification VB a braking action corresponding to the front-axle service-brake control pressure pV or to the redundancy service-brake control pressure pR is implemented, as described, via the spring-loaded parts 3b. When there is a parking-brake braking specification VP and simultaneous redundant pneumatic activation of the control valve 12 with the front-axle service-brake control pressure pV or the redundancy service-brake control pressure pR, i.e. when a switching-over signal S1 is not present, the redundant implementation of the service-brake braking specification VB at the rear wheels 3b is prevented automatically, as described.

While the above description constitutes the preferred embodiments of the present invention, it will be appreciated that the invention is susceptible to modification, variation and change without departing from the proper scope and fair meaning of the accompanying claims.

The invention claimed is:

1. A control valve (12) for applying a spring-loaded brake pressure (p3b) to spring-loaded parts (3b) of a rear-axle wheel brake (3), wherein the control valve (12) is activatable pneumatically via a second control input (12b) with a parking-brake control pressure (p5), wherein the parking-brake control pressure (p5) can act in such a manner on a control mechanism (14b, 15b, 17c, 22, 23, 24) arranged in a valve housing (12f) of the control valve (12) that a spring-loaded brake pressure (p3b) arises at a control output (12c) of the control valve (12) as a function of the parking-brake control pressure (p5) for bringing about a parking-brake braking specification (VP) with the spring-loaded parts (3b) of the rear-axle wheel brakes (3)

wherein the control valve (12) includes a first control connection (12a) for activating the control valve (12) with a service-brake control pressure (pV; pR) which is dependent on a service-brake braking specification (VB), wherein the first control connection (12a) is connectable to an adjustable first control chamber (14a), wherein the first control chamber (14a) is operatively connected to the control mechanism (14b, 15b, 17c, 22, 23, 24) arranged in the control valve (12) such that, during an adjustment of the first control chamber (14a) as a result of pressurization with the service-brake control pressure (pV; pR), the spring-loaded brake pressure (p3b) at the control output (12c) is set as a function of the service-brake control pressure (pV; pR), the parking-brake control pressure (p5), or a combination of the brake control pressure (pV; pR) and the parking-brake control pressure (p5);

wherein the control valve (12) includes a control device (20), wherein the control device (20) switches over a third control piston (15c) such that the first control connection (12a) is connected to the adjustable first control chamber (14a) via a connecting channel (19) for guiding the service-brake control pressure (pV; pR) into the first control chamber (14a), or that the atmosphere (A) is connected to the first control chamber (14a) for venting the first control chamber (14a).

2. The control valve (12) as claimed in claim 1, wherein the control mechanism comprises an adjustable second control chamber (14b) and an adjustable second control piston (15b), wherein the parking-brake control pressure (p5) is admitted into the second control chamber (14b) via the second control input (12b) and the second control piston (15b) is adjustable in a first direction (R1) or a second direction (R2) opposed to the first direction (R1) by action of the parking-brake control pressure (p5) on the second control piston (15b).

3. The control valve (12) as claimed in claim 2, wherein the second control chamber (14b) is bounded by a third wall (17c) arranged on the adjustable second control piston (15b), wherein the third wall (17c) is movable in relation to the valve housing (12f) such that the second control piston (15b) is adjusted by action of the parking-brake control pressure (p5) on the third wall (17c).

4. A control valve (12) for applying a spring-loaded brake pressure (p3b) to spring-loaded parts (3b) of a rear-axle wheel brake (3), wherein the control valve (12) is activatable pneumatically via a second control input (12b) with a parking-brake control pressure (p5), wherein the parking-brake control pressure (p5) can act in such a manner on a control mechanism (14b, 15b, 17c, 22, 23, 24) arranged in a valve housing (12f) of the control valve (12) that a spring-loaded brake pressure (p3b) arises at a control output (12c) of the control valve (12) as a function of the parking-brake control pressure (p5) for bringing about a parking-brake braking specification (VP) with the spring-loaded parts (3b) of the rear-axle wheel brakes (3)
  wherein the control valve (12) includes a first control connection (12a) for activating the control valve (12) with a service-brake control pressure (pV; pR) which is dependent on a service-brake braking specification (VB),
  wherein the first control connection (12a) is connectable to an adjustable first control chamber (14a),
  wherein the first control chamber (14a) is operatively connected to the control mechanism (14b, 15b, 17c, 22, 23, 24) arranged in the control valve (12) such that, during an adjustment of the first control chamber (14a) as a result of pressurization with the service-brake control pressure (pV; pR), the spring-loaded brake pressure (p3b) at the control output (12c) is set as a function of the service-brake control pressure (pV; pR), the parking-brake control pressure (p5), or a combination of the brake control pressure (pV; pR) and the parking-brake control pressure (p5);
  wherein the control mechanism comprises an adjustable second control chamber (14b) and an adjustable second control piston (15b), wherein the parking-brake control pressure (p5) is admitted into the second control chamber (14b) via the second control input (12b) and the second control piston (15b) is adjustable in a first direction (R1) or a second direction (R2) opposed to the first direction (R1) by action of the parking-brake control pressure (p5) on the second control piston (15b);
  wherein the first control chamber (14a) is operatively connected to a first control piston (15a), wherein the first control piston (15a) is operatively connected to the second control piston (15b) such that the second control piston (15b) is carried along by an adjustment of the first control piston (15a).

5. A control valve (12) for applying a spring-loaded brake pressure (p3b) to spring-loaded parts (3b) of a rear-axle wheel brake (3), wherein the control valve (12) is activatable pneumatically via a second control input (12b) with a parking-brake control pressure (p5), wherein the parking-brake control pressure (p5) can act in such a manner on a control mechanism (14b, 15b, 17c, 22, 23, 24) arranged in a valve housing (12f) of the control valve (12) that a spring-loaded brake pressure (p3b) arises at a control output (12c) of the control valve (12) as a function of the parking-brake control pressure (p5) for bringing about a parking-brake braking specification (VP) with the spring-loaded parts (3b) of the rear-axle wheel brakes (3)
  wherein the control valve (12) includes a first control connection (12a) for activating the control valve (12) with a service-brake control pressure (pV; pR) which is dependent on a service-brake braking specification (VB),
  wherein the first control connection (12a) is connectable to an adjustable first control chamber (14a),
  wherein the first control chamber (14a) is operatively connected to the control mechanism (14b, 15b, 17c, 22, 23, 24) arranged in the control valve (12) such that, during an adjustment of the first control chamber (14a) as a result of pressurization with the service-brake control pressure (pV; pR), the spring-loaded brake pressure (p3b) at the control output (12c) is set as a function of the service-brake control pressure (pV; pR), the parking-brake control pressure (p5), or a combination of the brake control pressure (pV; pR) and the parking-brake control pressure (p5);
  wherein the control mechanism comprises an adjustable second control chamber (14b) and an adjustable second control piston (15b), wherein the parking-brake control pressure (p5) is admitted into the second control chamber (14b) via the second control input (12b) and the second control piston (15b) is adjustable in a first direction (R1) or a second direction (R2) opposed to the first direction (R1) by action of the parking-brake control pressure (p5) on the second control piston (15b);
  wherein the first control chamber (14a) is operatively connected to a first control piston (15a), wherein the first control piston (15a) is operatively connected to the second control piston (15b) such that the second control piston (15b) is carried along by an adjustment of the first control piston (15a);
  wherein the first control piston (15a) and the second control piston (15b) are fixedly connected to one another.

6. The control valve (12) as claimed in claim 4, wherein the first control chamber (14a) is bounded by a first wall (17a) which is movable in relation to a valve housing (12f) and by a second wall (17b) which is fixed to the valve housing (12f), wherein the first control piston (15a) is connected to the first wall (17a) in such that the first control piston (15a) and the second control piston (15b) which is operatively connected thereto are forced by an increase in pressure in the first control chamber (14a) in a first direction (R1).

7. A control valve (12) for applying a spring-loaded brake pressure (p3b) to spring-loaded parts (3b) of a rear-axle wheel brake (3), wherein the control valve (12) is activatable pneumatically via a second control input (12b) with a parking-brake control pressure (p5), wherein the parking-brake control pressure (p5) can act in such a manner on a control mechanism (14b, 15b, 17c, 22, 23, 24) arranged in a valve housing (12f) of the control valve (12) that a spring-loaded brake pressure (p3b) arises at a control output (12c) of the control valve (12) as a function of the parking-brake control pressure (p5) for bringing about a parking-brake braking specification (VP) with the spring-loaded parts (3b) of the rear-axle wheel brakes (3)
  wherein the control valve (12) includes a first control connection (12a) for activating the control valve (12) with a service-brake control pressure (pV; pR) which is dependent on a service-brake braking specification (VB),
  wherein the first control connection (12a) is connectable to an adjustable first control chamber (14a), wherein the first control chamber (14a) is operatively connected to the control mechanism (14b, 15b, 17c, 22, 23, 24) arranged in the control valve (12) such that, during an adjustment of the first control chamber (14a) as a result of pressurization with the service-brake control pressure (pV; pR), the spring-loaded brake pressure (p3b) at the control output (12c) is set as a function of the service-brake control pressure (pV; pR), the parking-brake control pressure (p5), or a combination of the brake control pressure (pV; pR) and the parking-brake control pressure (p5);

wherein the control mechanism comprises an adjustable second control chamber (14b) and an adjustable second control piston (15b), wherein the parking-brake control pressure (p5) is admitted into the second control chamber (14b) via the second control input (12b) and the second control piston (15b) is adjustable in a first direction (R1) or a second direction (R2) opposed to the first direction (R1) by action of the parking-brake control pressure (p5) on the second control piston (15b);

wherein the first control chamber (14a) is operatively connected to a first control piston (15a), wherein the first control piston (15a) is operatively connected to the second control piston (15b) such that the second control piston (15b) is carried along by an adjustment of the first control piston (15a);

wherein the first control chamber (14a) is bounded by a first wall (17a) which is movable in relation to a valve housing (12f) and by a second wall (17b) which is fixed to the valve housing (12f), wherein the first control piston (15a) is connected to the first wall (17a) in such that the first control piston (15a) and the second control piston (15b) which is operatively connected thereto are forced by an increase in pressure in the first control chamber (14a) in a first direction (R1);

wherein the second control chamber (14b) is arranged relative to the first control chamber (14a) such that the second control piston (15b) and the first control piston (15a) which is operatively connected thereto are forced in the second direction (R2) when there is an increase in pressure in the second control chamber (14b).

8. The control valve (12) as claimed in claim 7, wherein the second control chamber (14b) is bounded by the second wall (12b) which is fixed to the valve housing (12f), and wherein, when there is an increase in pressure in the second control chamber (14b), the second control piston (15b) is pushed away from the second wall (12b) in the second direction (R2), and, when there is an increase in pressure in the first control chamber (14a), the first control piston (15a) is pushed away from the second wall (12b) in the first direction (R1).

9. The control valve (12) as claimed in claim 2, wherein the first control chamber (14a) and the second control chamber (14b) interact with each other via the control pistons (15a, 15b) such that a spring-loaded brake pressure (p3b) arises at the control output (12c), said spring-loaded brake pressure being dependent on the parking-brake control pressure (p5) prevailing in the second control chamber (14b) or on the service-brake control pressure (pV; pR) prevailing in the first control chamber (14a), depending on which of the two control pressures (p5, pV; pR) is the highest.

10. The control valve (12) as claimed in claim 3, wherein an area ratio (F) between the first wall (17a) and the third wall (17c) is between 1:2 and 2:1.

11. The control valve (12) as claimed in claim 2, wherein an axially movable valve body (22) which is pretensioned by a compression spring (23) defines the control mechanism, wherein, depending on the axial adjustment of the valve body (22), the control output (12c) is connectable either via a pressure chamber (16) to a venting connection (12e) for reducing the spring-loaded brake pressure (p3b) or to a supply connection (12d) for increasing the spring-loaded brake pressure (p3b), wherein the second control piston (15b) adjusts the valve body (22) axially as a function of the parking-brake control pressure (p5), the service-brake control pressure (pV; pR), or a combination of the brake control pressure (pV; pR) and the parking-brake control pressure (p5).

12. An electronically controllable brake system (1) comprising:
front-axle wheel brakes (2),
rear-axle wheel brakes (3) with a spring-loaded part (3b) and a membrane part (3c),
an electro-pneumatically controllable front-axle pressure modulator (6) for outputting a front-axle brake pressure (p2) to the front-axle wheel brakes (2),
an electronically controllable rear-axle pressure modulator (11) for outputting a membrane-brake pressure (p3c) to the membrane parts (3c) of the rear-axle wheel brakes (3), a central module (7), and
an electro-pneumatic service-brake valve (4),
wherein the service-brake valve (4) is configured to output an electric service-brake actuating signal (S4) to the central module (7) as a function of a service-brake braking specification (VB),
wherein the central module (7) is connected in a signal-conducting manner to the front-axle pressure modulator (6) and to the rear-axle pressure modulator (11) for transmitting control signals (S2, S3), which are dependent on the service-brake actuating signal (S4), to the pressure modulators (6, 11),
wherein the service-brake valve (4) is configured to output a pneumatic service-brake control pressure (pV; pR) as a function of the service-brake braking specification (VB), wherein, in the event of redundancy, the front-axle pressure modulator (6) is activatable via a redundancy connection (6a) with a front-axle service-brake control pressure (pV),
wherein the brake system (1) furthermore includes a parking-brake valve (5) and the parking-brake valve (5) outputs a parking-brake control pressure (p5) to a second control input (12b) of a control valve (12) as a function of a parking-brake braking specification (VP), wherein the control valve (12) produces a spring-loaded brake pressure (p3b) as a function of the parking-brake control pressure (p5) and outputs the spring-loaded brake pressure via a control output (12c) to the spring-loaded parts (3b) of the rear-axle wheel brakes (3),
wherein the control valve (12) for producing the spring-loaded brake pressure (p3b), is activatable pneumatically via the second control input (12b) with the parking-brake control pressure (p5), wherein the parking-brake control pressure (p5) can act in such a manner on a control mechanism (14b, 15b, 17c, 22, 23, 24) arranged in a valve housing (12f) of the control valve (12) that the spring-loaded brake pressure (p3b) arises at the control output (12c) of the control valve (12) as a function of the parking-brake control pressure (p5) for bringing about the parking-brake braking specification (VP) with the spring-loaded parts (3b) of the rear-axle wheel brakes (3)

wherein the control valve (12) includes a first control connection (12a) for activating the control valve (12) with the service-brake control pressure (pV; pR) which is dependent on the service-brake braking specification (VB), wherein the first control connection (12a) is connectable to an adjustable first control chamber (14a), wherein the first control chamber (14a) is operatively connected to the control mechanism (14b, 15b, 17c, 22, 23, 24) arranged in the control valve (12) such that, during an adjustment of the first control chamber (14a) as a result of pressurization with the service-brake control pressure (pV; pR), the spring-loaded brake pressure (p3b) at the control output (12c) is set as a function of the service-brake control pressure (pV; pR), the parking-brake control pressure (p5), or a combination of the brake control pressure (pV; pR) and the parking-brake control pressure (p5);

wherein the service-brake valve (4) is connected pneumatically to the first control connection (12a) of the control valve (12) for transmitting the service-brake control pressure (pV; pR) to the control valve (12) and for outputting the spring-loaded brake pressure (p3b) as a function of the parking-brake control pressure (p5) and/or of the service-brake control pressure (pV; pR).

13. The electronically controllable brake system (1) as claimed in claim 12, wherein the central module (7) is connected in a signal-conducting manner to the control valve (12) for transmitting a switching-over signal (S1) for connecting the first control connection (12a) of the control valve (12) to the first control chamber (14a) or the atmosphere (A) to the first control chamber (14a), wherein, during normal operation without a defect or a failure in the electric activation of the rear-axle pressure modulator (11), it can be predetermined via the switching-over signal (S1) that the atmosphere (A) is connected to the first control chamber (14a) and, otherwise, the first control connection (12a) of the control valve (12) is connected to the first control chamber (14a).

14. The electronically controllable brake system (1) as claimed in claim 12, wherein the service-brake valve (4) includes a single channel, and the front-axle control pressure (pV) which is supplied to the front-axle pressure modulator (6) by the service-brake valve (4) is supplied via a branch line (13) to the first control connection (12a) of the control valve (12).

15. The electronically controllable brake system (1) as claimed in claim 12, wherein the service-brake valve (4) includes two channels, wherein a first channel (K1) is connected to the redundancy connection (6a) of the front-axle pressure modulator (6) for pneumatically activating the front-axle pressure modulator (6) with the front-axle service-brake control pressure (pV) and a second channel (K2) is connected to the first control connection (12a) of the control valve (12) for transmitting a redundancy control pressure (pR) produced in the service-brake valve (4) to the control valve (12).

16. A method for controlling an electrically controllable brake system (1) as claimed in claim 12, the method comprising the steps of:
detecting, by the membrane part (3c)(St0), that an electric defect or a failure in the electric activation of the rear-axle wheel brakes (3) is present;
connecting the first control input (12a) to the first control chamber (14a), and
applying a spring-loaded brake pressure (p3b) which is dependent on the service-brake control pressure (pV; pR) (St1a) to the spring-loaded parts (3b) of the rear-axle wheel brakes (3).

17. The method as claimed in claim 16, wherein the central module (7) predetermines for the control valve (12) during normal operation without detection of an electric defect or a failure in the electric activation of the rear-axle wheel brakes (3) by the membrane part (3c) (St0), via the switching-over signal (S1), that the first control chamber (14a) is connected (St1a) to the atmosphere (A).

* * * * *